United States Patent
Lee et al.

(10) Patent No.: US 9,548,521 B2
(45) Date of Patent: Jan. 17, 2017

(54) BATTERY MODULE INCLUDING A FLEXIBLE MEMBER

(71) Applicant: SK Innovation Co., Ltd., Seoul (KR)

(72) Inventors: Won Jun Lee, Daejeon (KR); Ji Seok Lee, Chungcheongnam-do (KR); Dae Won Kwon, Suwon-si (KR)

(73) Assignee: SK Innovation Co., Ltd., Seoul (KR)

( * ) Notice: Subject to any disclaimer, the term of this patent is extended or adjusted under 35 U.S.C. 154(b) by 50 days.

(21) Appl. No.: 14/362,202

(22) PCT Filed: Dec. 4, 2012

(86) PCT No.: PCT/KR2012/010426
§ 371 (c)(1),
(2) Date: Jun. 2, 2014

(87) PCT Pub. No.: WO2013/085247
PCT Pub. Date: Jun. 13, 2013

(65) Prior Publication Data
US 2014/0356675 A1    Dec. 4, 2014

(30) Foreign Application Priority Data
Dec. 5, 2011 (KR) ........................ 10-2011-0128870

(51) Int. Cl.
| | | |
|---|---|---|
| *H01M 2/02* | (2006.01) | |
| *H01M 10/6555* | (2014.01) | |
| *H01M 10/613* | (2014.01) | |
| *B60L 11/18* | (2006.01) | |
| *H01M 10/625* | (2014.01) | |
| *H01M 10/615* | (2014.01) | |
| *H01M 10/647* | (2014.01) | |
| *H01M 2/10* | (2006.01) | |

(52) U.S. Cl.
CPC ...... *H01M 10/5004* (2013.01); *B60L 11/1874* (2013.01); *B60L 11/1879* (2013.01); *H01M 2/02* (2013.01); *H01M 10/613* (2015.04); *H01M 10/615* (2015.04); *H01M 10/625* (2015.04); *H01M 10/647* (2015.04); *H01M 10/6555* (2015.04); *B60L 2240/545* (2013.01); *H01M 2/0242* (2013.01); *H01M 2/1077* (2013.01); *Y02T 10/7005* (2013.01); *Y02T 10/705* (2013.01); *Y02T 10/7011* (2013.01)

(58) Field of Classification Search
CPC .. H01M 2/02; H01M 10/042; H01M 10/0445; H01M 10/60; H01M 10/6554; H01M 10/6555; H01M 10/6556; H01M 10/6557; H01M 2/0242; H01M 10/5004; H01M 10/5006
See application file for complete search history.

(56) References Cited

U.S. PATENT DOCUMENTS

| | | | |
|---|---|---|---|
| 7,682,732 B2 * | 3/2010 | Kim et al. ................... | 429/149 |
| 8,304,104 B2 | 11/2012 | Lee et al. | |
| 2006/0093899 A1 * | 5/2006 | Jeon et al. ..................... | 429/99 |
| 2006/0204840 A1 * | 9/2006 | Jeon et al. ................... | 429/152 |
| 2012/0282506 A1 * | 11/2012 | Hohenthanner ...... | H01M 2/021 429/99 |
| 2013/0130078 A1 * | 5/2013 | Schaefer et al. ................ | 429/72 |

FOREIGN PATENT DOCUMENTS

| | | | |
|---|---|---|---|
| DE | 10 2009 040 147 | * | 3/2011 |
| JP | 08-083624 | * | 3/1996 |
| JP | 2006196230 A | | 7/2006 |
| JP | 2007018917 A | | 1/2007 |
| JP | 2009301877 A | | 12/2009 |
| JP | 2011238374 A | | 11/2011 |
| KR | 1020070014631 B1 | | 2/2007 |
| KR | 1020110030225 A | | 3/2011 |
| WO | WO 2011/057815 | * | 5/2011 |

OTHER PUBLICATIONS

Machine translation of the abstract of JP 08-083624, published on Mar. 26, 1996.*

* cited by examiner

*Primary Examiner* — Anca Eoff
(74) *Attorney, Agent, or Firm* — The Webb Law Firm (57) ABSTRACT

Provided is a battery module including a flexible member including: a housing; at least one separation wall partitioning an inside of the housing into a predetermined number of separated spaces; at least two unit battery cells including a case, a battery cell included in the case, and negative and positive electrodes tabs connected to the battery cell; and a flexible member inserted between the unit battery cells, wherein the unit battery cells and the flexible member are included in a space partitioned by the separation wall.

4 Claims, 11 Drawing Sheets

BATTERY MODULE INCLUDING A FLEXIBLE MEMBER

CROSS-REFERENCE TO RELATED APPLICATIONS

This application is the United States national phase of International Application No. PCT/KR2012/010426 filed Dec. 4, 2012, and claims priority to Korean Patent Application No. 10-2011-0128870 filed Dec. 5, 2011, the disclosures of which are hereby incorporated in their entirety by reference.

TECHNICAL FIELD

The present invention relates to a battery module including a flexible member, and more particularly, to a battery module including a flexible member capable of more efficiently performing heating and cooling on an inside of a unit battery cell or a temperature adjustment of the inside of the unit battery cell.

BACKGROUND ART

Generally, a secondary battery may be rechargeable and have increased capacity. A representative example of the secondary battery includes a nickel cadmium battery, a nickel hydrogen battery, a lithium ion battery, and the like. Among them, the lithium ion battery has been spotlighted as the next generation power source due to excellent characteristics such as a long lifespan, high capacity, and the like. Among them, a lithium secondary battery, which has operating voltage of 3.6 V or more, is used as a power supply of a portable electronic device or several lithium secondary batteries are connected in series with each other to thereby be used for a high output hybrid vehicle. Since this lithium secondary battery has operating voltage three times higher than that of the nickel-cadmium battery or the nickel-metal hydride battery and is more excellent in view of energy density characteristics per unit weight than the nickel-cadmium battery or the nickel-metal hydride battery, the use of the lithium secondary battery has rapidly increased.

The lithium secondary battery may be manufactured in various types. A representative type of the lithium secondary battery may include a cylindrical type and a prismatic type that are mainly used for the lithium ion battery. A lithium polymer battery that has been recently spotlighted is manufactured in a pouch type having flexibility, such that it has a relatively free shape. In addition, the lithium polymer battery has excellent stability and light weight, such that it is advantageous for slimness and lightness of the portable electronic device.

Meanwhile, in a case of a power supply for driving a motor of an electric automobile, or the like requiring a large amount of power, several tens of secondary battery cells are connected in series or parallel with each other to thereby configure a battery module.

When a plurality of battery modules are charged or discharged, heat is generated from the cell and charging or discharging performance of the battery cell may be varied depending on a temperature of the cell.

Therefore, it is important to maintain an internal temperature of the battery at appropriate temperature.

A secondary battery module disclosed in Korean Patent Laid-Open Publication No. 2007-0014631 according to the related art includes a plurality of unit cells which are stacked and arranged to efficiently cool heat generated from the unit cell, and a plurality of partitions installed between the unit cells and having a cooling passage formed therein and protrusions formed on both surfaces thereof.

Therefore, the related art relates to a method of cooling the plurality of cells while a heat transferring medium is circulated in the plurality of partitions.

However, since the related art has a configuration of cooling only regions in which the protrusions formed on the both surfaces of the partition and the plurality of unit cells are in contact with each other, there is a problem that regions in which the protrusions and the plurality of unit cells are not in contact with each other are not cooled.

RELATED ART DOCUMENT

Patent Document

Korean Patent Laid-Open Publication No. 2007-0014631 (Feb. 1, 2007)

DISCLOSURE

Technical Problem

An object of the present invention is to provide a battery module including a flexible member capable of improving heat transferring efficiency by including the flexible member between battery cells and closely adhering the battery cell to a separation wall side of a housing to allow the battery cell and the separation wall to be closely adhered to each other.

Technical Solution

In one general aspect, a battery module including a flexible member includes: a housing; at least one separation wall partitioning an inside of the housing into a predetermined number of separated spaces; at least two unit battery cells including a case, a battery cell included in the case, and negative and positive electrodes tabs connected to the battery cell; and a flexible member inserted between the unit battery cells, wherein the unit battery cells and the flexible member are included in a space partitioned by the separation wall.

The battery module may further include at least one heat transferring member disposed among the unit battery cells, the separation wall, and the flexible member in a direction of an inner surface of the housing.

The flexible member may be formed in a plate shape.

The flexible member may be formed of one material selected from styrene butadien rubber, polychloroprene rubber, acrylonitrile-butadiene rubber, isoprene-isobutylene rubber, butadiene rubber, isoprene rubber, ethylene propylene rubber, polysulfide rubber, silicone rubber, fluororubber, urethane rubber, and acrylic rubber.

The flexible member may include protrusion parts having at least one predetermined region protruded to correspond to each other, and may be formed in a shape of a pair of plates in which the protrusion parts are coupled to each other to be opposite to each other.

The flexible member may be formed in a shape of a pair of plates including depression parts having predetermined regions depressed to correspond to each other and a surface formed in a concave-convex shape.

The flexible member may be formed of aluminum or a thermal conductive metal material.

Advantageous Effects

As set forth above, the battery module including the flexible member according to the present invention configures the flexible member between the unit battery cells, such that the unit battery cells and the separation wall are closely adhered to each other by the flexible member to thereby increase adhesion, thereby making it possible to improve the heat transferring efficiency.

In addition, since the battery module including the flexible member according to the present invention has the configuration of cooling the unit battery cells by the heat transfer, it is not necessary to separately configure the cooling passage in the housing.

In addition, the battery module including the flexible member according to the present invention may further improve the cooling effect achieved by the heat transfer by configuring the heat transferring member.

DESCRIPTION OF DRAWINGS

The above and other objects, features and advantages of the present invention will become apparent from the following description of preferred embodiments given in conjunction with the accompanying drawings, in which.

BEST MODE

Hereinafter, a technical spirit of the present invention will be described in more detail with reference to the accompanying drawings.

Figure 1:
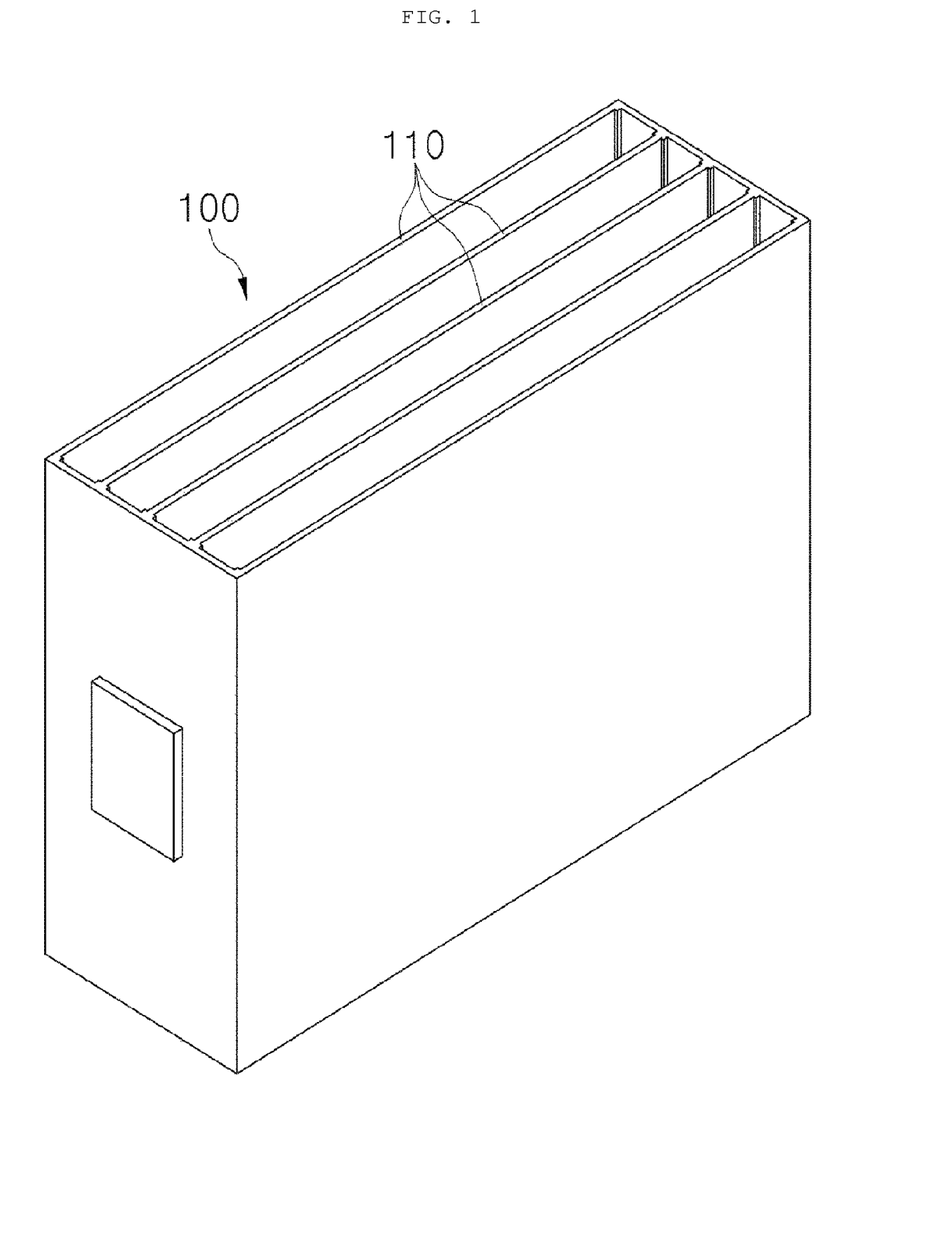
FIG. 1 is a perspective view of a housing according to an embodiment of the present invention.
Figure 2:
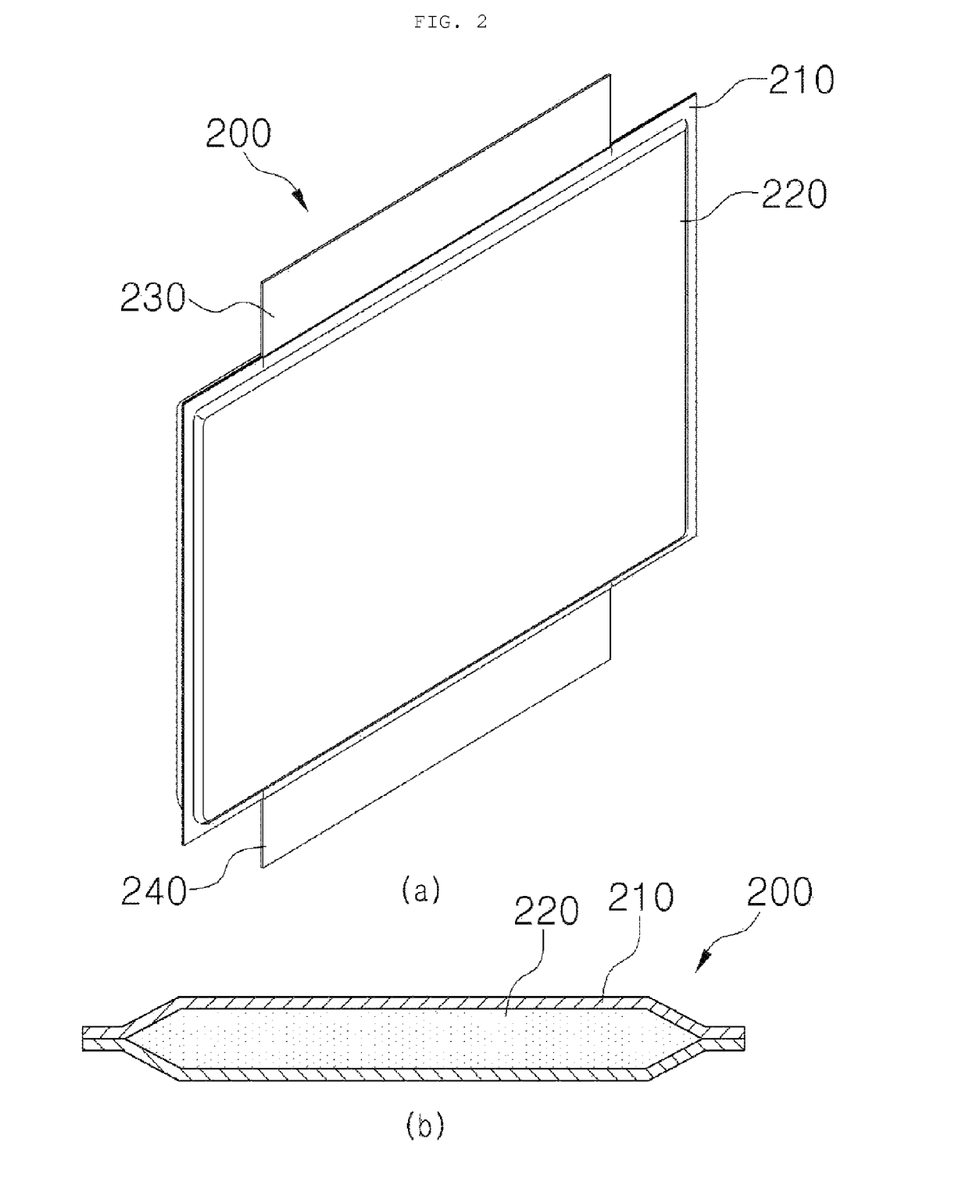
FIG. 2 is a perspective view and a cross-sectional view of a unit battery cell according to an embodiment of the present invention.
Figure 3:
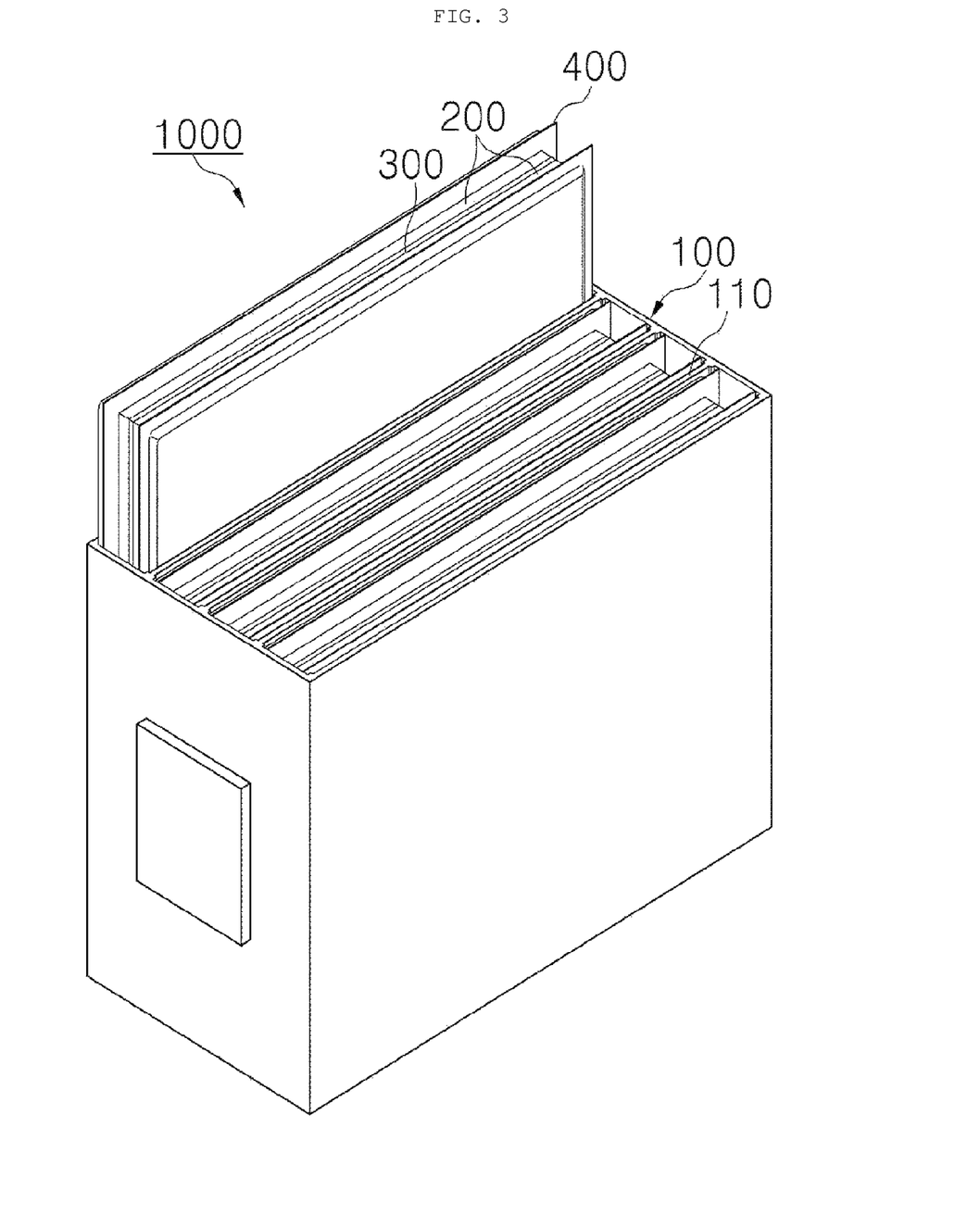
FIG. 3 is a perspective view of a battery module including a flexible member according to an embodiment of the present invention.
Figure 4:
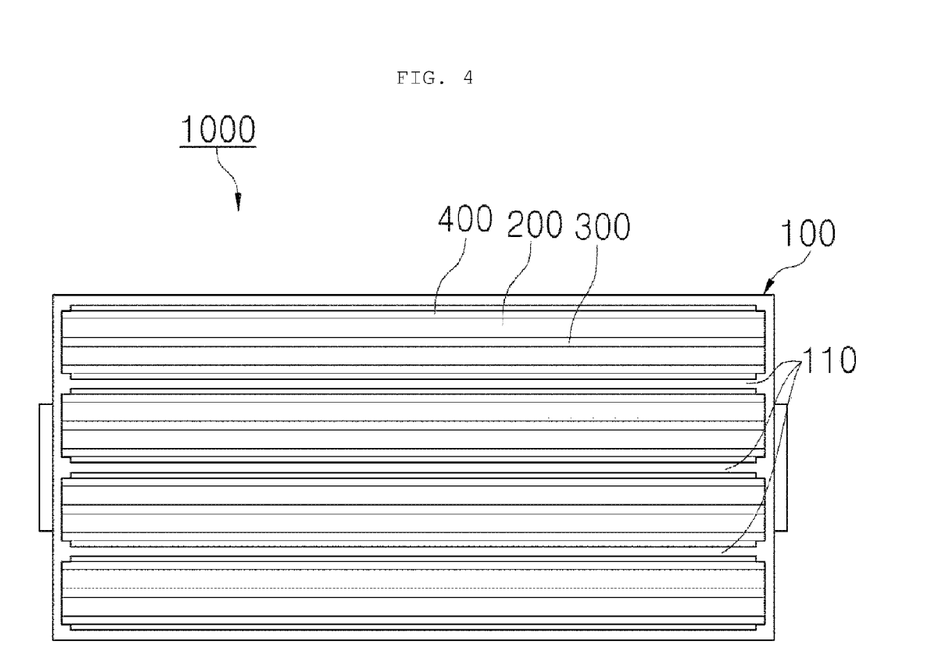
FIG. 4 is a plan view of a battery module including a flexible member according to an embodiment of the present invention.

FIG. 1 is a perspective view of a housing according to an embodiment of the present invention, FIG. 2 is a perspective view and a cross-sectional view of a unit battery cell according to an embodiment of the present invention, FIG. 3 is a perspective view of a battery module including a flexible member according to an embodiment of the present invention, and FIG. 4 is a plan view of a battery module including a flexible member according to an embodiment of the present invention.

A battery module 1000 according to an embodiment of the present invention is formed to generally include a housing 100, a unit battery cell 200, and a flexible member 300.

Referring to FIG. 1, the housing 100, which is a basic body of the battery module 1000 including the unit battery cell 200 and the flexible member 300 according to the present invention, has the unit battery cell 200 therein.

In addition, separation walls 110 are formed of aluminum or thermal conductive metal material.

Although the FIG. 1 shows an embodiment in which the housing 100 is partitioned into a predetermined number of separated spaces by the separation walls 110, the present invention is not limited thereto, but may be more variously embodied.

Referring to FIG. 2, the unit battery cell 200 is formed to include a case 210, a battery cell 220 included in the case 210, and a positive electrode tab 230 and a negative electrode tab 240 connected to the battery cell 220 and exposed to the outside, and at least two unit battery cells 200 are respectively provided in a space part 120 of the housing 100.

In this case, the separation wall 110 receives heat generated from a surface which is in contact with the unit battery cell 200 and discharges the heat in a vertical direction.

However, adhesion between the unit battery cell 200 and the separation wall 110 has a limitation. To this problem, the battery module 1000 including the flexible member according to the present invention has configured a flexible member 300 between the unit battery cells 200.

Referring to FIGS. 3 and 4, the flexible member 300 is formed of a flexible and reducible material and is inserted between the unit battery cells 200.

In addition, the flexible member 300 may be formed in a plate shape.

In this case, the flexible member 300 is formed of one material selected from styrene butadien rubber (SBR), polychloroprene rubber (CR), acrylonitrile-butadiene rubber (NBR), isoprene-isobutylene rubber (IIR), butadiene rubber (BR), isoprene rubber (TR), ethylene propylene rubber (EPR), polysulfide rubber, silicone rubber, fluororubber, urethane rubber, and acrylic rubber.

In addition, the flexible member 300 may allow the unit battery cells 200 to be closely adhered to the separation wall 110 side.

That is, the flexible member 300 aids to transfer a more amount of heat generated from the unit battery cells 200 to the separation wall 110 by allowing the unit battery cells 200 to be closely adhered to the separation wall 110 side.

As a result, the battery module 1000 including the flexible member according to the present invention configures the flexible member 300 between the unit battery cells 200, such that the unit battery cells 200 and the separation wall 110 are closely adhered to each other to thereby increase adhesion, thereby making it possible to improve heat transferring efficiency.

In addition, since the battery module 1000 including the flexible member according to the present invention has the configuration of cooling the unit battery cells 200 by the heat transfer, it is not necessary to separately configure the cooling passage in the housing 100.

In addition, the battery module 1000 including the flexible member according to the present invention further includes at least one heat transferring member disposed among the unit battery cells 200, the separation wall 110, and the flexible member 300 in a direction of an inner surface of the housing.

In this case, the heat transferring member 400 receives heat generated from a surface which is in contact with the unit battery cells 200, the separation wall 110 or the flexible member 300 and discharges the heat in a vertical direction.

In addition, the heat transferring member 400 is formed of aluminum or thermal conductive metal material which is the same material as the separation wall 110.

In addition, the heat transferring member 400 may be formed in a bent form in which an edge thereof is bent into an inner side of the separation wall 110.

As a result, the battery module 1000 including the flexible member according to the present invention may further improve cooling effect achieved by the heat transfer by configuring the heat transferring member 400.

In addition, the battery module 100 including the flexible member according to the present invention has a structure in which the unit battery cells 200, the flexible member 300, and the heat transferring member 400 are stacked, and is included in a space partitioned by the separation wall 110 of the housing 100. FIG. 3 shows a preferred embodiment of the stacked structure and a detailed description thereof will be provided below.

Figure 5:
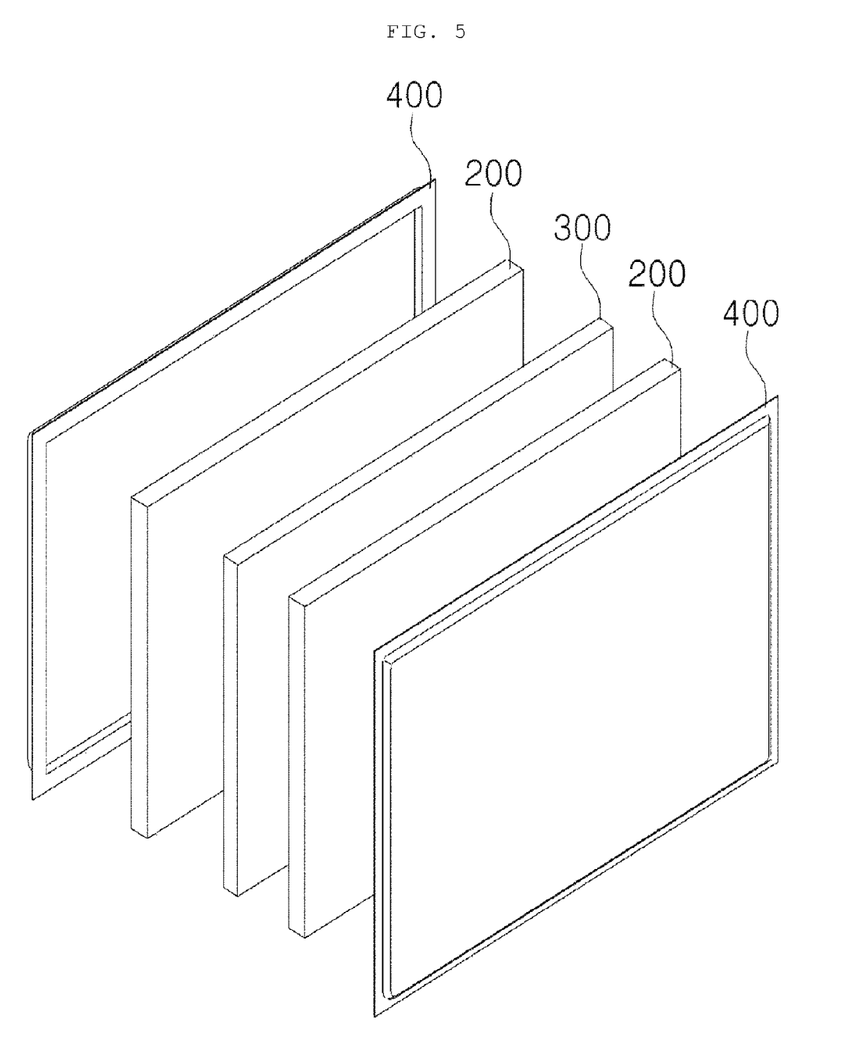
FIG. 5 is an exploded perspective view of a stacked structure shown in FIG. 3.

FIG. 5 is an exploded perspective view of a stacked structure shown in FIG. 3.

As shown in FIG. 5, the battery module 1000 including the flexible member according to the present invention is preferably formed to maximize the cooling effect by being formed in a structure in which one heat transferring member 400, one unit battery cell 200, a flexible member 300, another unit battery cell 200, and another heat transferring member 400 are sequentially stacked.

Of course, the battery module 1000 including the flexible member according to the present invention is preferably formed in the structure in which one heat transferring member 400, one unit battery cell 200, a flexible member 300, another unit battery cell 200, and another heat transferring member 400 are sequentially stacked, but is not limited thereto. For example, more variously stacked structures may be used.

Figure 6:
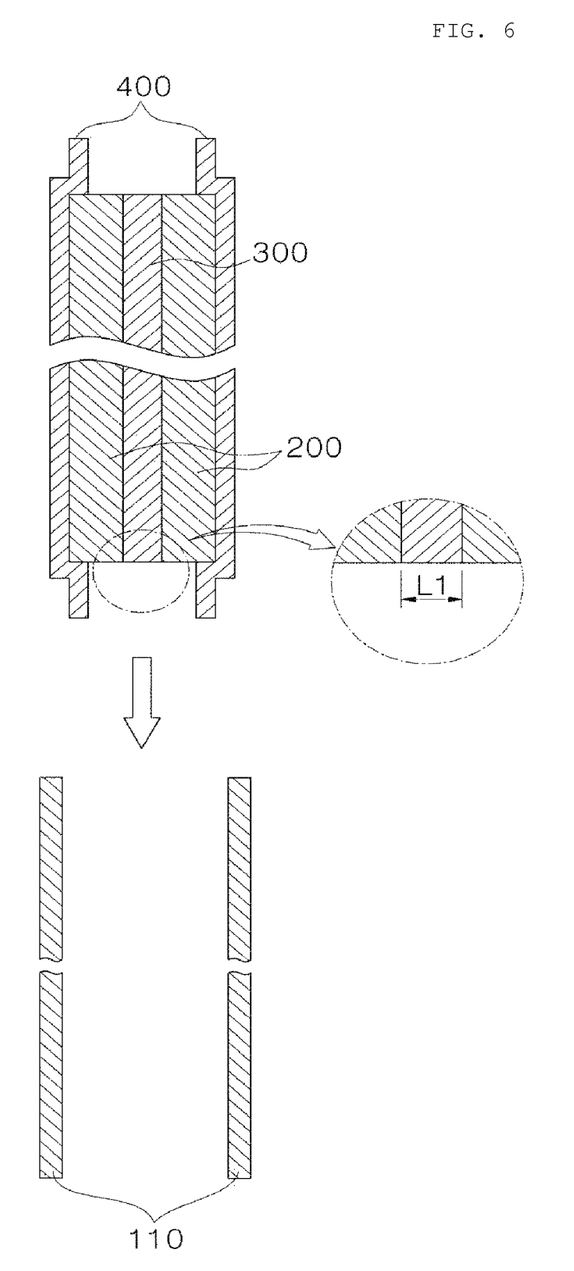
FIG. 6 is a cross-sectional view of a stacked structure shown in FIG. 3.
Figure 7:
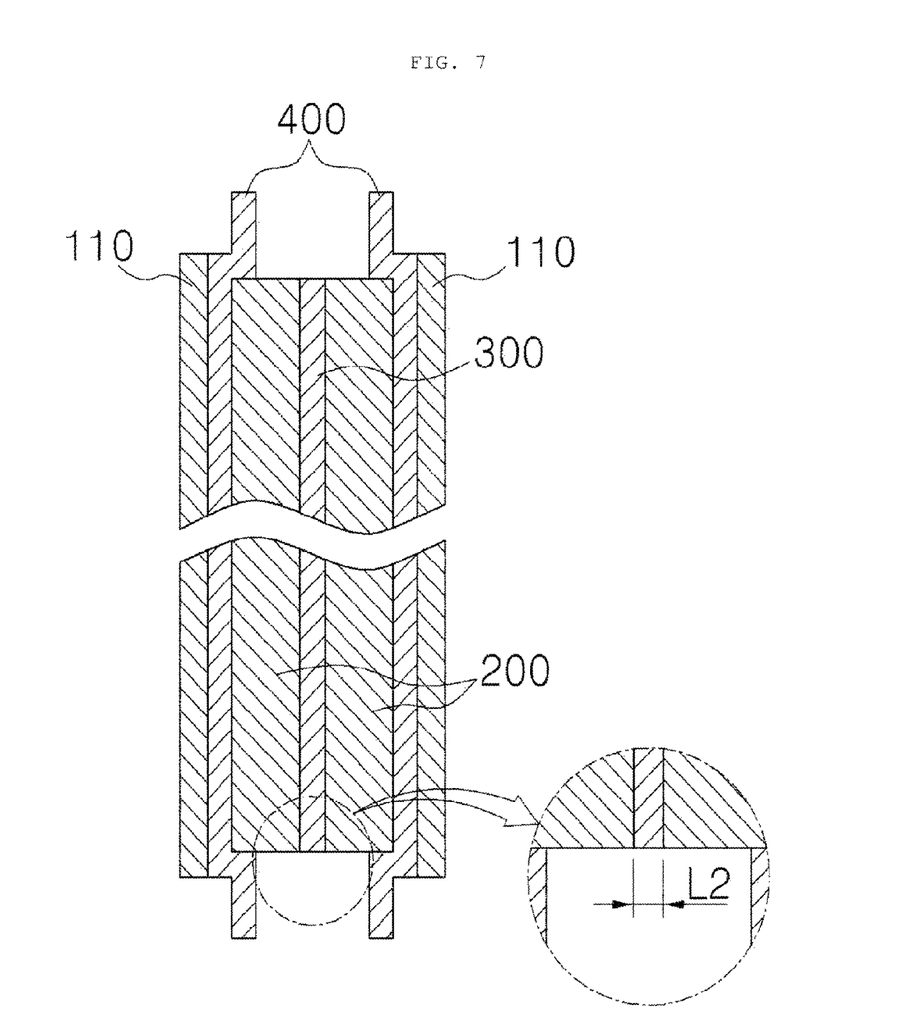
FIG. 7 is a cross-sectional view of a housing including the stacked structure shown in FIG. 3.

FIG. 6 is a cross-sectional view of a stacked structure shown in FIG. 3 and FIG. 7 is a cross-sectional view of a housing including the stacked structure shown in FIG. 3.

As shown in FIG. 6 in the stacked structure shown in FIG. 3, the flexible member 300 has a length L1 of a normal state.

As shown in FIG. 7, when the stacked structure shown in FIG. 3 is included in the housing 100, the flexible member 300 has a length L2 shorter than the length L1 of the normal state while being pressed, and allows the unit battery cells 200 which are in contact with both sides of the flexible member 300 to be again closely adhered to the separation wall 110 side by repulsive force.

The unit battery cells 200 receiving the adhesion allows the heat transferring member 400 to be closely adhered to the separation wall 110 side.

As a result, in the battery module 1000 including the flexible member according to the present invention, the unit battery cells 200, the separation wall 110, and the heat transferring member 400 are closely adhered to each other by the flexible member 300, such that the adhesion is increased, thereby making it possible to further improve heat transferring efficiency.

Figure 8:
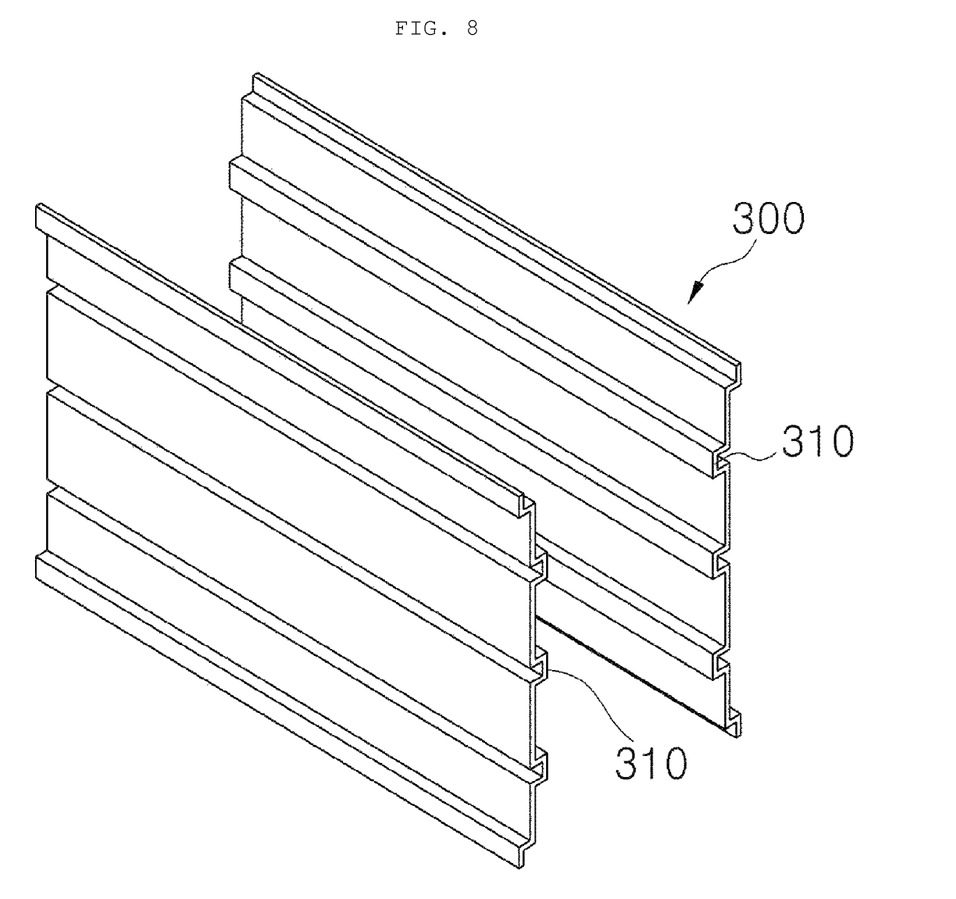
FIGS. 8 to 11 show various embodiments of a flexible member according to the present invention.
Figure 9:
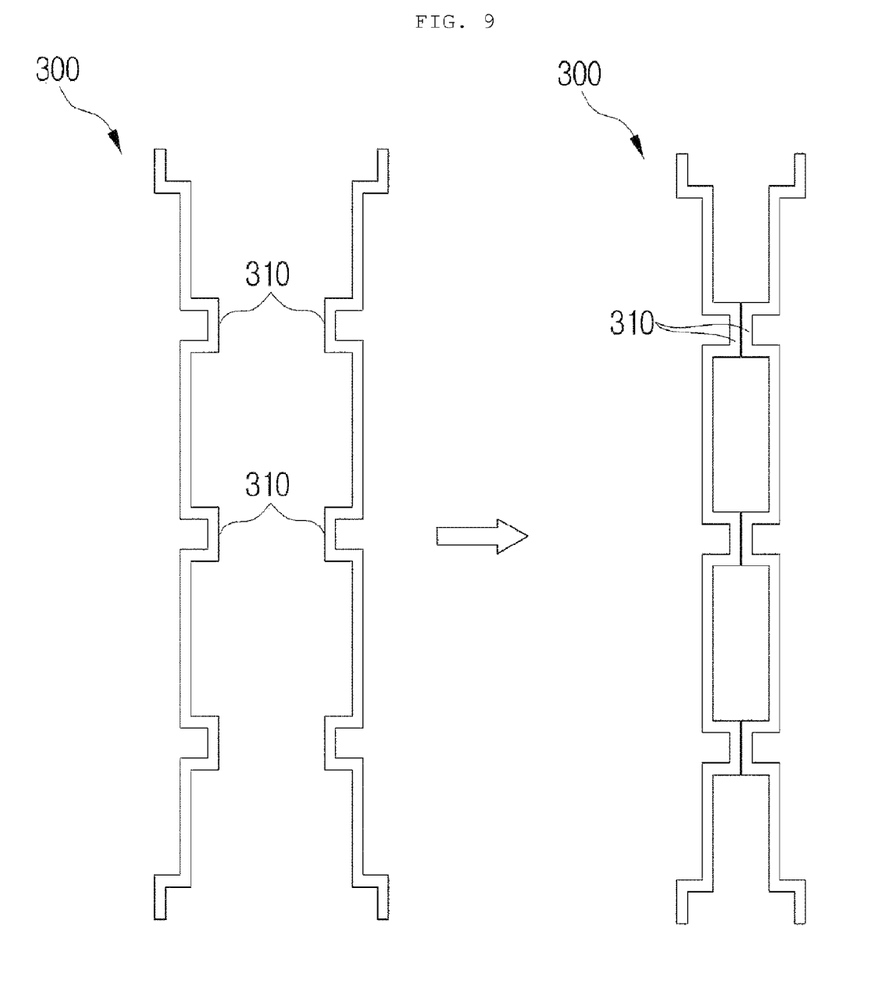

FIG. 8 is a perspective view of an embodiment of the flexible member and FIG. 9 is a perspective view of an embodiment of the flexible member.

Referring to FIGS. 8 and 9, the flexible member 300 includes protrusion parts 310 having predetermined regions on at least one side protruded to correspond to each other, and may be formed in a shape of a pair of plates in which edges of the other sides are bent to correspond to each other and the protrusion parts 310 are coupled to each other to be opposite to each other.

In this case, when the flexible member 300 formed according to the embodiments shown in FIGS. 8 and 9 is inserted between the battery cells, the protrusion part 310 of the flexible member 300 receives compressive force to thereby again apply the repulsive force to the separation wall 110 side.

Figure 10:
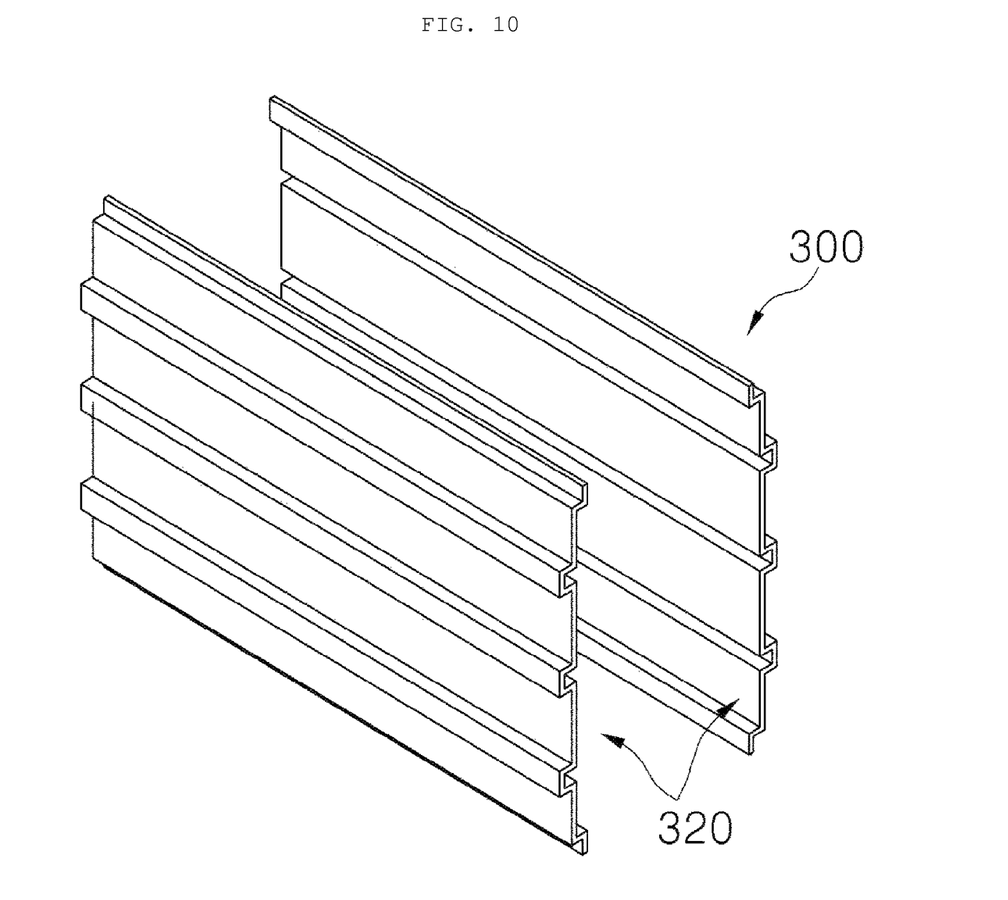
Figure 11:
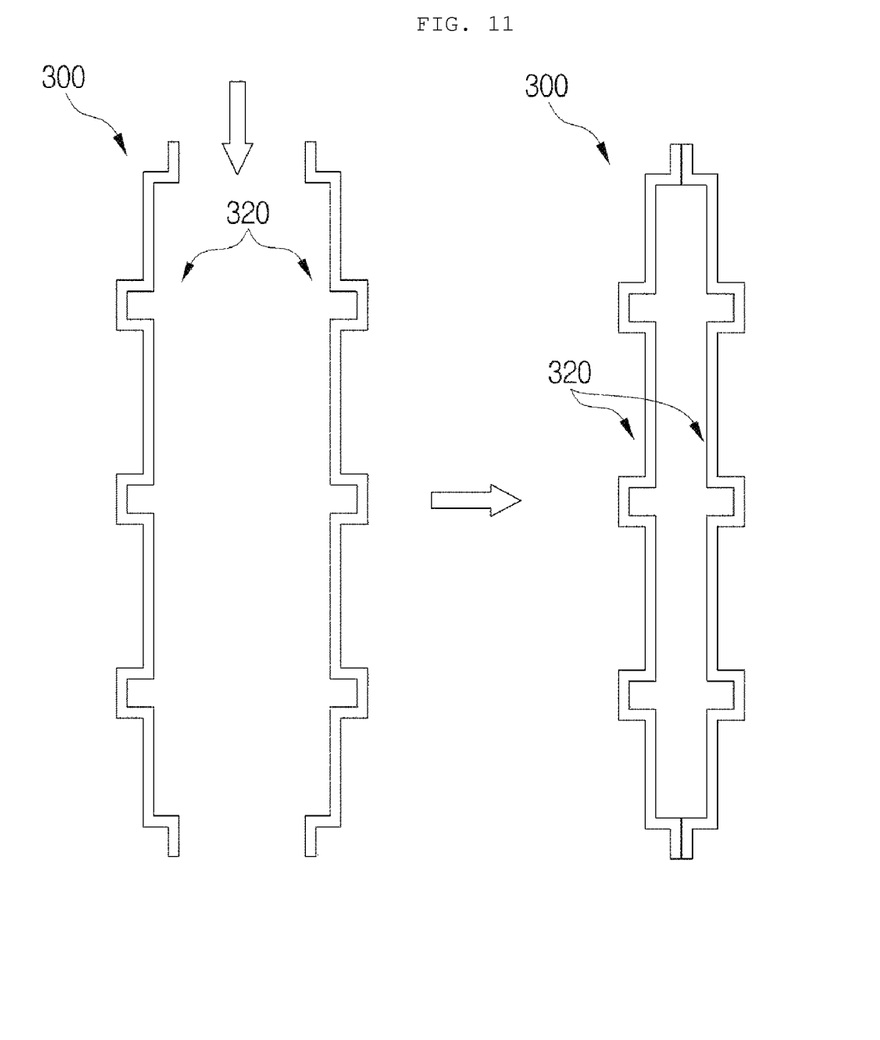

FIG. 10 is a perspective view of another embodiment of the flexible member and FIG. 11 is a perspective view of another embodiment of the flexible member.

Referring to FIGS. 10 and 11, the flexible member 300 may be formed in a shape of a pair of plates including a depression part 320 having predetermined regions on one side depressed to correspond to each other and a surface formed in a concave and convex shape.

In this case, when the flexible member 300 formed according to the embodiments shown in FIGS. 10 and 11 is inserted between the battery cells, the depression part 320 of the flexible member 300 receives the compressive force to thereby again apply the repulsive force to the separation wall 110 side.

In addition, in the case in which the flexible member 300 is formed according to the embodiments shown in FIGS. 8 to 11, the flexible member 300 is formed of aluminum or a thermal conductive metal material.

The accompanying drawings are only examples shown in order to describe the technical idea of the present invention in more detail. Therefore, the technical idea of the present invention is not limited to shapes of the accompanying drawings.

The present invention is not limited to the above-mentioned exemplary embodiments, and may be variously applied, and may be variously modified without departing from the gist of the present invention claimed in the claims.

The invention claimed is:

1. A battery module comprising:
   a housing;
   at least one separation wall partitioning an inside of the housing into a predetermined number of separated spaces;
   at least two unit battery cells including a case, a battery cell included in the case, and negative and positive electrodes tabs connected to the battery cell; and
   a flexible member inserted between the unit battery cells;
   wherein the unit battery cells and the flexible member are included in a space partitioned by the separation wall; and
   wherein the flexible member is formed in a shape of a pair of plates in which protrusion parts are coupled to each other to be opposite to each other.

2. The battery module of claim 1, wherein the flexible member is formed of aluminum or a thermal conductive metal material.

3. A battery module comprising:
   a housing;
   at least one separation wall partitioning an inside of the housing into a predetermined number of separated spaces;
   at least two unit battery cells including a case, a battery cell included in the case, and negative and positive electrodes tabs connected to the battery cell; and
   a flexible member inserted between the unit battery cells;
   wherein the unit battery cells and the flexible member are included in a space partitioned by the separation wall; and
   wherein the flexible member is formed in a shape of a pair of plates including depression parts having predetermined regions depressed to correspond to each other and a surface formed in a concave-convex shape.

4. The battery module of claim 3, wherein the flexible member is formed of aluminum or a thermal conductive metal material.

\* \* \* \* \*